United States Patent
Wyatt et al.

(10) Patent No.: US 9,319,161 B2
(45) Date of Patent: *Apr. 19, 2016

(54) PARTICIPATING IN TELEVISION PROGRAMS

(75) Inventors: Christopher W. Wyatt, Dallas, TX (US); Mark A. Harwell, Plano, TX (US); Ryland M. Reed, North Richland Hills, TX (US)

(73) Assignee: YOUTOO TECHNOLOGIES, LLC, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,335

(22) Filed: Apr. 9, 2012

(65) Prior Publication Data

US 2013/0268951 A1    Oct. 10, 2013

(51) Int. Cl.
| | |
|---|---|
| H04N 7/16 | (2011.01) |
| H04H 60/33 | (2008.01) |
| H04N 21/2547 | (2011.01) |
| H04N 21/254 | (2011.01) |
| H04N 21/2543 | (2011.01) |
| H04N 21/258 | (2011.01) |
| H04N 21/475 | (2011.01) |
| H04N 21/4784 | (2011.01) |

(52) U.S. Cl.
CPC ........... *H04H 60/33* (2013.01); *H04N 21/2542* (2013.01); *H04N 21/2543* (2013.01); *H04N 21/2547* (2013.01); *H04N 21/25866* (2013.01); *H04N 21/4758* (2013.01); *H04N 21/4784* (2013.01)

(58) Field of Classification Search
CPC .......... H04N 21/2542; H04N 21/2543; H04N 21/2547
USPC .......... 725/4, 5, 9, 11, 13, 23, 24, 32, 60, 105
See application file for complete search history.

(56) References Cited

U.S. PATENT DOCUMENTS

| | | | |
|---|---|---|---|
| 5,488,433 A | 1/1996 | Washino et al. | |
| 5,537,314 A | * 7/1996 | Kanter ........................ | 705/14.13 |

(Continued)

OTHER PUBLICATIONS

International Search Report and Written Opinion of the International Searching Authority issued in international application No. PCT/US2012/022355, mailed Apr. 9, 2012, 12 pages.

(Continued)

*Primary Examiner* — Dominic D Saltarelli
(74) *Attorney, Agent, or Firm* — Spencer C. Patterson; Grable Martin Fulton, PLLC

(57) ABSTRACT

Methods, systems, and apparatus, including computer programs encoded on a computer storage medium, for enabling viewers to participate in a television program. In one aspect, a method includes transmitting a linear television program that includes a request for viewer responses to be submitted using a user device and receiving, through a communication network, an electronic message including a viewer response to the request from a user. Consideration is received from the user, and the consideration is associated with the viewer response. Credits are allocated to the user in response to receiving the viewer response and consideration. A record of the one or more credits is stored in association with an identifier of the user, and in response to a request from the user, credits associated with the identifier of the user are redeemed in exchange for virtual goods or services associated with delivery of content over a network.

51 Claims, 8 Drawing Sheets

(56) References Cited

U.S. PATENT DOCUMENTS

| | | | |
|---|---|---|---|
| 5,982,425 | A | 11/1999 | Allen et al. |
| 6,584,450 | B1 | 6/2003 | Hastings et al. |
| 6,697,103 | B1 | 2/2004 | Fernandez et al. |
| 6,757,482 | B1 | 6/2004 | Ochiai et al. |
| 6,774,926 | B1 | 8/2004 | Ellis et al. |
| 6,918,131 | B1 * | 7/2005 | Rautila et al. ............ 725/34 |
| 6,941,515 | B1 | 9/2005 | Wilkins |
| 7,562,300 | B1 | 7/2009 | Tobias et al. |
| 7,649,937 | B2 | 1/2010 | Rabenold et al. |
| 7,769,819 | B2 | 8/2010 | Lerman et al. |
| 7,904,490 | B2 | 3/2011 | Ogikubo |
| 8,051,447 | B2 | 11/2011 | Stallings et al. |
| 8,189,945 | B2 | 5/2012 | Stojancic et al. |
| 8,266,667 | B2 * | 9/2012 | O'Donnell et al. ........ 725/133 |
| 8,311,382 | B1 | 11/2012 | Harwell et al. |
| 8,359,616 | B2 * | 1/2013 | Rosenberg et al. .......... 725/42 |
| 2001/0004743 | A1 | 6/2001 | Krueger et al. |
| 2002/0007313 | A1 * | 1/2002 | Mai et al. ................ 705/14 |
| 2002/0056119 | A1 | 5/2002 | Moynihan |
| 2002/0104099 | A1 | 8/2002 | Novak |
| 2002/0112005 | A1 | 8/2002 | Namias |
| 2002/0120930 | A1 * | 8/2002 | Yona ..................... 725/34 |
| 2004/0008249 | A1 | 1/2004 | Nelson et al. |
| 2004/0078825 | A1 | 4/2004 | Murphy |
| 2004/0117786 | A1 | 6/2004 | Kellerman et al. |
| 2006/0074752 | A1 | 4/2006 | Newmark |
| 2006/0271977 | A1 | 11/2006 | Lerman et al. |
| 2006/0294538 | A1 | 12/2006 | Li et al. |
| 2007/0133034 | A1 | 6/2007 | Jindall et al. |
| 2007/0162487 | A1 | 7/2007 | Frailey |
| 2007/0203911 | A1 | 8/2007 | Chiu |
| 2007/0291747 | A1 | 12/2007 | Stern et al. |
| 2007/0300271 | A1 | 12/2007 | Allen et al. |
| 2008/0143875 | A1 | 6/2008 | Scott et al. |
| 2008/0243692 | A1 | 10/2008 | Trimper et al. |
| 2008/0263589 | A1 | 10/2008 | Jacobson et al. |
| 2009/0012961 | A1 | 1/2009 | Bramson et al. |
| 2009/0012965 | A1 | 1/2009 | Franken |
| 2009/0037605 | A1 | 2/2009 | Li |
| 2009/0064250 | A1 | 3/2009 | Nakata |
| 2009/0070675 | A1 | 3/2009 | Li |
| 2009/0199234 | A1 | 8/2009 | Mukerji et al. |
| 2010/0066804 | A1 | 3/2010 | Shoemake et al. |
| 2010/0081116 | A1 | 4/2010 | Barasch et al. |
| 2010/0125795 | A1 | 5/2010 | Yu et al. |
| 2010/0205562 | A1 | 8/2010 | De Heer |
| 2010/0241623 | A1 | 9/2010 | Acker et al. |
| 2010/0274696 | A1 | 10/2010 | Krietzman et al. |
| 2010/0274847 | A1 | 10/2010 | Anderson et al. |
| 2010/0293580 | A1 | 11/2010 | Latchman |
| 2010/0306815 | A1 | 12/2010 | Emerson et al. |
| 2011/0030031 | A1 | 2/2011 | Lussier et al. |
| 2011/0037864 | A1 | 2/2011 | Cao |
| 2011/0113454 | A1 | 5/2011 | Newell et al. |
| 2011/0145070 | A1 | 6/2011 | Wolinsky et al. |
| 2011/0154200 | A1 | 6/2011 | Davis et al. |
| 2011/0188836 | A1 | 8/2011 | Popkiewicz et al. |
| 2011/0191163 | A1 | 8/2011 | Allaire et al. |
| 2012/0041759 | A1 | 2/2012 | Barker et al. |
| 2012/0189282 | A1 | 7/2012 | Wyatt et al. |
| 2012/0192215 | A1 | 7/2012 | Wyatt et al. |
| 2012/0192220 | A1 | 7/2012 | Wyatt et al. |
| 2012/0192225 | A1 | 7/2012 | Harwell et al. |
| 2012/0192239 | A1 | 7/2012 | Harwell et al. |
| 2012/0297423 | A1 | 11/2012 | Kanojia et al. |
| 2012/0304230 | A1 | 11/2012 | Harwell et al. |
| 2012/0304237 | A1 | 11/2012 | Harwell et al. |

OTHER PUBLICATIONS

International Search Report and Written Opinion of the International Searching Authority issued in international application No. PCT/US2012/022246, mailed Mar. 21, 2012, 12 pages.

* cited by examiner

PARTICIPATING IN TELEVISION PROGRAMS

BACKGROUND

This specification relates to remotely participating in television programs. For example, viewers watching a television program from a remote end (e.g., in front of a TV at home, instead of on-site) may submit information to participate in the television program and/or interact with other players.

Network technologies enable various types of remote human interaction. For example, people may use text messaging or audio or video content for remote chatting, reporting, conferencing, etc. In some instances, such communication may have a central host, such as a virtual chat room, a reality show, etc. Participants may use phone calls, email, SMS messages, or online audio or video chat to provide input or feedback to the central host.

Viewers typically view professionally produced television programs ("programs") and motion pictures ("movies") using traditional television services. Programs, such as various types of game shows, are typically distributed to traditional television service providers by so-called "television networks," who possess the legal rights necessary to distribute the programs, and who are sometimes also involved in producing the programming. Those who provide transmission services for television, and provide television service to viewers, may include "carriers" or Multi-Service Operators ("MSO"), direct-broadcast satellite (DBS) providers, and/or telecommunication ("Telco") providers.

Television transmission or distribution systems used by traditional carriers of television programming include terrestrial broadcast stations, satellite television, and cable television systems, as well as telecom delivery network services such as VDSL and FiOS offered over broadcast telecommunication or data networks, whose operators provide television services similar to what are offered by cable and satellite television service providers. However, standards have been formulated, or are in the process of being formulated, for using Internet protocols and the public Internet to distribute television programming using "live" IP-multicast or IP unicast streams that can be received by anyone with any type of broadband data connection to the Internet.

SUMMARY

Implementations of the present disclosure are generally directed to using virtual currencies to participate in a television show (game shows, reality show, talk show, or scripted drama show). The virtual currencies may be created and managed in association with a television program or video delivery system. Users may earn or buy points of the virtual currency that can be redeemed for virtual goods, credit, services, or a combination of different rewards. For example, users may use actual cash or credit to purchase points and use the points to submit an entry to a nationally or locally televised game show or other type of interactive television program. Users may earn points by winning in the program (e.g., having the users' entry selected or responding with a correct answer), promoting the program (e.g., informing friends about the show via one or more digital communications such as email or social media), or conducting other activities according to published rewards guidelines. Users may use an application downloaded and installed on their electronic mobile devices to participate. The television show host may have backend security system monitoring the process and enforcing rules or practices that prevent unfair advantages based on location, connection speed, bandwidth, or other factors. Rewards may be redeemed directly through the application, for example, rewards may include uploading and broadcasting live or recorded audio and/or video content, entering a second round of games, converting the points to credits for spending, or other redemption options.

In one general aspect, a method for allowing users to participate in a television show can include transmitting a linear television program that may include a request for viewer responses to be submitted using a user device. For example, the viewer responses can be answers to factual or opinion questions, feedback on television contestants, control of an object displayed on television, or others. An electronic message including a viewer response to the request from a user can be received through a communication network. A payment associated with the viewer response can be received from the user. One or more credits can then be allocated to the user in response to receiving the viewer response and receiving payment from the user. A record can be stored for the one or more credits in association with an identifier of the user. In response to a request from the user, credits associated with the identifier of the user can be redeemed in exchange for virtual goods or services associated with delivery of content over a network.

These and other embodiments can each optionally include one or more of the following features. A plurality of electronic messages are received through a communication network from a plurality of users, and each electronic message includes a viewer response to the request from a respective user. Consideration is received from each of the plurality of users, and the consideration for each user is associated with the viewer response from the respective user. One or more credits are allocated to each user in response to receiving the viewer response from the respective user and receiving the consideration from the respective user. A record of the one or more credits is stored in association with an identifier of the respective user. Credits associated with the identifier of each respective user are redeemed, in response to requests from one or more of the plurality of users, in exchange for virtual goods or services associated with delivery of content over a network. One or more of the plurality of users is selected to receive an award having monetary value, and each user is selected based on the viewer response of the respective user. The request for viewer responses includes an offer for the award having monetary value in exchange for a viewer response that at least satisfies predetermined criteria. The request for viewer responses includes an offer for the award having monetary value in exchange for a viewer response that is selected for distribution. One or more of the plurality of users are selected to receive an award associated with delivery of content over a network, and each user is selected based on the viewer response of the respective user. The number of credits allocated to each user is based upon one or more criteria related to the viewer response of the respective user. One or more of the plurality of users are selected to compete for an award based on viewer responses from the one or more selected users to requests included in the linear television programming. The award includes an opportunity to participate in a linear television program. The consideration includes, at least in part, credits purchased for monetary value, wherein the credits are associated with the user; credits stored in association with an identifier of the user; and/or credits earned through performing predefined actions. The virtual goods or services associated with delivery of content over a network include an opportunity to submit at least one of a video, an audio message, or a textual message to be included in linear television programming; an opportunity to submit at least one of a video, an audio message, or a textual message to be included in content delivered from a web server; and/or a premium user experience associated with content delivered from a web server. The electronic message is submitted by the user through an application on a user device, and the application is associated with the linear television program. The application is skinned by a distributor of the linear television program and/or by a producer of the linear television program. The electronic message is submitted by the user through a web page displayed on a user device, and the web page is associated with the linear television program. Compensation is provided to a local television station that broadcasts the linear television program to the user.

In another general aspect, a method for allowing users to participate in a television show can include receiving, through a communication network, a plurality of electronic messages each including a viewer response from a respective user device, wherein the electronic messages are received in response to a request included in a linear television program, and deducting payments from user accounts associated with users of the user devices, wherein each payment is associated with the viewer response from the respective user device. One or more credits are allocated to one or more of the users in response to at least receiving the viewer response from the respective user device. A record of the one or more credits is stored in association with an identifier of the one or more users, wherein the credits are redeemable in exchange for virtual goods or services.

These and other embodiments can each optionally include one or more of the following features. The one or more credits are allocated to the one or more users based on criteria associated with the viewer responses. The payments are based on credits purchased for monetary value. The virtual goods or services include an opportunity to submit at least one of a video or a textual message to be included in linear television programming. The virtual goods or services include an opportunity to submit at least one of a video or a textual message to be included in content delivered from a web server.

In another general aspect, a system for allowing users to participate in a television show can include a user device and one or more servers operable to interact with the user device. The one or more servers may be adapted to transmit data for use in presenting a user interface on the user device, wherein the user interface is adapted to receive user input for submitting a response to a request for viewer responses included in a linear television program; receive an electronic message, wherein the electronic message includes a response to the request, with the response received through the user device; deduct a payment from a user account associated with a user of the user device; allocate one or more credits to the user account in response to receiving the electronic message; and store a record of the one or more credits in association with the user account.

These and other embodiments can each optionally include one or more of the following features. The one or more servers are further operable to receive a request to redeem the credits associated with the user account for virtual goods or services associated with delivery of content over a network. The one or more servers are further operable to allocate compensation to a distributor of the linear television program based on the electronic message.

In another general aspect, a method for allowing users to participate in a television show can include transmitting a linear television program, wherein the linear television program includes a request for viewer responses to be submitted using a user device; receiving, through a plurality of communication networks, electronic messages from a plurality of viewers, with each electronic message including a viewer response to the request through a user device from a corresponding viewer; combining data from the electronic messages to generate aggregate data; and including a display of the aggregate data in the linear television program.

These and other embodiments can each optionally include one or more of the following features. The aggregate data includes an average of data included in the plurality of viewer responses. The request for viewer responses includes a request for feedback relating to the linear television program. The plurality of electronic messages are received through a plurality of user devices remotely located from a studio source of the linear television program. One or more of the plurality of viewers are selected to receive an award having monetary value, with each viewer selected based on the viewer response of the corresponding viewer. The electronic message is submitted by each of the plurality of viewers through an application on a corresponding user device, with the application associated with the linear television program. The electronic message is submitted by each of the plurality of viewers through a web page displayed on a corresponding user device, with the web page associated with the linear television program.

Particular embodiments of the subject matter described in this specification can be implemented so as to realize one or more of the following advantages. Contests that award cash or prizes with cash value can be associated with linear or broadcast television programs in which viewers purchase or earn credits or points that can be applied in connection with submitting a response. Viewers can be rewarded for participation and/or for responses that meet predetermined criteria by awarding credits or points, in addition to having an opportunity to earn cash or prizes with cash value. In some cases, points can be earned through activities performed by a user without having to purchase the points. Credits or points can be used to purchase virtual goods or services, such as a chance to be in a live studio audience, to be an in-studio contestant, to submit video or other content for inclusion on one or more linear television programs and program formats or on a web page. Viewers can be incentivized to participate in interactive television programming. Viewers can use a slider to indicate preference of a contestant in a show. Data collected from the viewers can be compiled and presented as rich graphics in real-time on the viewers' television screens, simultaneously on mobile devices, and/or on web pages via computers connected to the Internet. Viewers can use other virtual game controls to manipulate objects on TV using mobile devices, for example. Objects can be manipulated, for example, based on the average input from viewers, the majority viewer input, input by more than some threshold number of participants, or based on some other technique for selecting input from a plurality of viewers. Based on the selected input, a more limited number of competitors can be selected for the next round in a game. Alternatively, the number of competitors for the next round can be selected in some other manner (e.g., randomly or based on some other criteria). In some embodiments, the viewers who are selected as winners for their participation can be on TV immediately via web cameras or cameras imbedded in mobile devices. In some embodiments, a number of selected winners can be invited to a studio for future TV production. The TV program may be broadcasted and modified by a local station that applies a skin application for tailoring the user interfaces on mobile devices with local information, such as local promotions or local participants in the TV show. Due to connection speed variation across the nation, the TV program gaming server may adjust bandwidth and other factors to ensure fair viewer participation and opportunity.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are directed to systems and methods of allowing remote viewers to participate in television programs. Television programs send out requests for viewer responses (e.g., by broadcasting audio, video, and/or text-based requests for viewers to respond to a question or provide feedback). In some implementations, the requests for viewer responses can include an offer of cash or prizes having cash value to be awarded to at least a portion of the viewers based on predetermined criteria (e.g., answering a question correctly). A gaming server may simultaneously send digital requests for participation to mobile devices or to web pages on computers connected to the Internet. Viewers can submit responses in the form of a digital text-based message, a digital voice recording, a digital video recording, by manipulating virtual gaming controls, or other ways using mobile electronic devices such as a cellular phone, a smart phone, a computer, or other electronic device that transmit the response over a communication network. The response can be associated with payment information included in the response or identified based on a user identifier included in the response. Alternatively, the payment information can be identified based on a payment account associated with a communication session (e.g., associated with user login credentials). The payment can be in the form of virtual credits or points, which can be awarded in exchange for a monetary payment or earned by complying with predetermined criteria (e.g., answering questions correctly, viewing online advertisements, or otherwise accepting third party offers). Payment may also be sponsored by an advertiser instead of user-paid. The payment can be exchanged for submitting the response to the television programs. In exchange for submitting the response, a viewer may be awarded additional credits or points. In addition, different amounts of credits or points can be awarded based on compliance with certain predefined criteria, such as correctly answering a question, answering within a particular period of time, and/or providing a response that is selected for inclusion in television programming. Accumulated credits or points can be redeemed on virtual goods, services, or other show-related commodities. For example, viewers can redeem credits or points in exchange for participating in television programs associated with a viewer response system, as discussed in more detail below.

Figure 1:
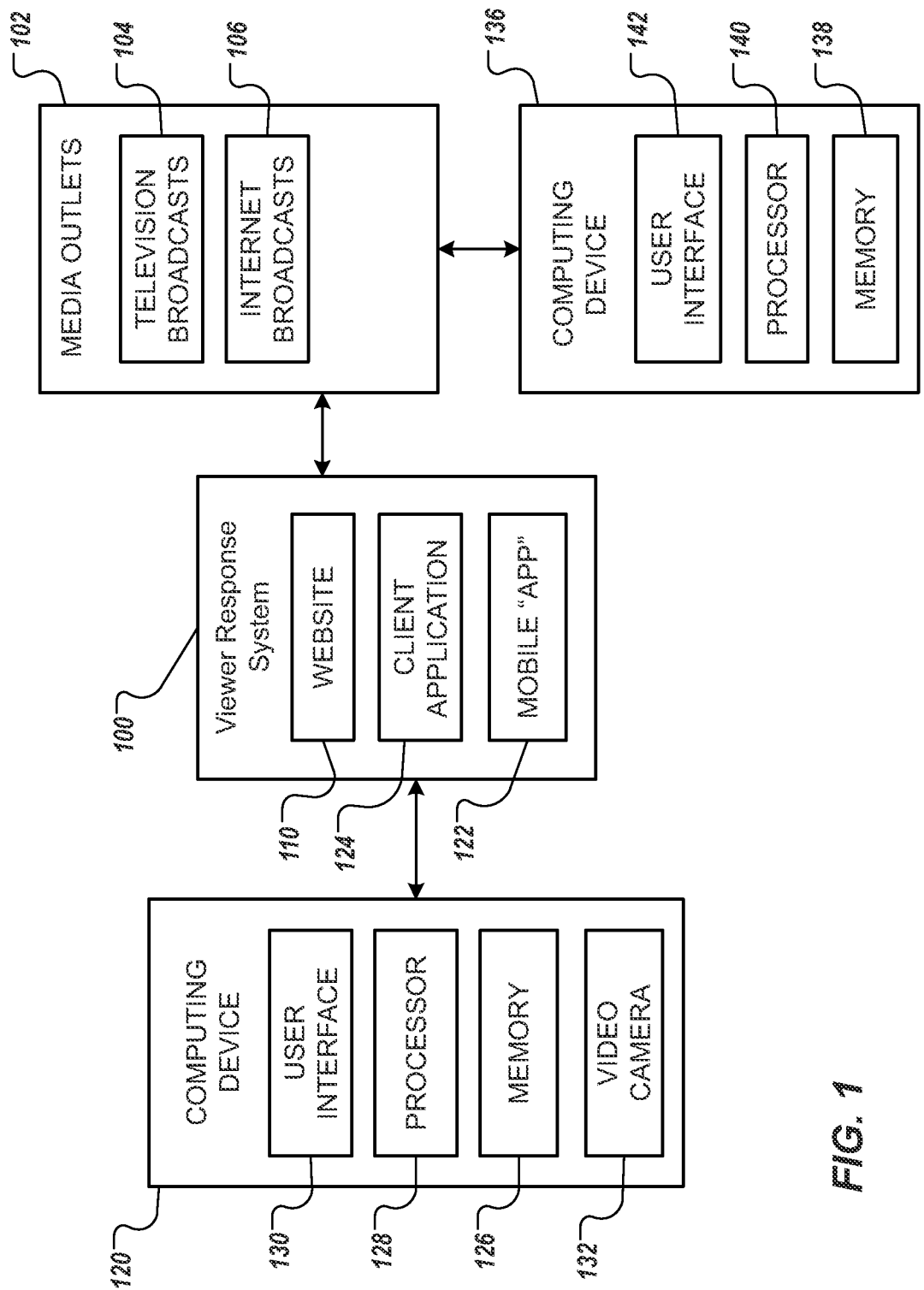
FIG. 1 is a functional block diagram of an example interactive television system.

FIG. 1 depicts an example viewer response system 100. The viewer response system 100 can be provided as a set of interconnected software and server systems. These software and systems can be used to submit user-generated, text, voice, data, or visual content in response to a request included in a television program or other transmitted programming. For example, various end users can submit responses from a variety of digital sources for the purpose of participating in a television program distributed through one or more content distribution outlets. The user-generated content can be responses to television program requests, such as answers to questions in a game show, voting activities in a reality show, or other responses solicited in a television program. The programming can be aired or distributed by various media outlets 102, including, for example, on television broadcasts 104, Internet television 106, video on demand (VOD), within various computer-based social networks, and/or within other online media and applications. The programming can also be transmitted to a computing device 136, which includes a user interface 142, a processor 140, and a memory 138. The computing device 136 may be, for example, a personal computer (a laptop, desktop, tablet, etc.), a personal digital assistant, a smart phone, or other computing devices. In general, programming can be in the form of video (with or without accompanying audio) and can be represented in files (e.g., video files).

Generally, programming broadcasts can include the distribution of audio and video content to a dispersed audience. Television broadcasts, for example, can include the distribution of content using air-wave, satellite, and/or cable technologies. Internet broadcast may also be used and may facilitate distribution to a single view or to multiple viewers (e.g., depending on viewing authorizations and whether the transmission is distributed on demand or as a one to many broadcasts).

The viewer response system 100 can include a website 110 that is hosted using one or more computing devices (e.g., server systems), a client application 124 that is at least partially executable on a client computing device, and/or a mobile application 122 that is executable on a mobile computing device. Components of the viewer response system 100 can be provided as one or more executable application programs that can be executed using one or more computing devices, and/or one or more hardware components (e.g., computing devices and/or computer-readable memory). In some implementations, the viewer response system 100 is provided as an application that is installed on a user computing device 120 to generate digital content, and/or a back-end computing device, such as a server system that communicates with the user computing device 120 to provide a thin client application that is executed in part on the server system and in part on the user computing device 120 (e.g., using a browser application on the user computing device 120).

The viewer response system 100 can also include one or more content creation and/or content distribution sub-systems. In some implementations, the sub-systems can include recording, encoding, and/or storage functionalities, as described with reference to FIG. 1 of U.S. patent application Ser. No. 13/185,471. Such functionalities can be used to submit video or other content using a website 110, mobile application 122, or client application 124 on a computing device 120 as part of a response to a broadcasted request for viewer responses, as awarded as a prize for submitting a viewer response, in exchange for points or credits accumulated by a user of the computing device 120, or as otherwise made available by the media outlets 102 and/or viewer response system 100.

To create, edit, and upload responses to requests for viewer responses, a user can make use of the computing device 120. Example computing devices 120 can include any type of computing device such as a desktop computer, a laptop computer, a handheld computer, a tablet, a personal digital assistant (PDA), a cellular telephone, a network appliance, a camera, a smart phone, an enhanced general packet radio service (EGPRS) mobile phone, or a combination of any two or more of these data processing devices or other data processing devices. The computing device 120 can communicate with the viewer response system 100 over a network. The network can include a large computer network, such as a local area network (LAN), wide area network (WAN), the Internet, a cellular network, a satellite, or a combination thereof connecting any number of mobile computing devices, fixed computing devices, and/or server systems.

As described in greater detail below, mobile application software 122 can be downloaded to and executed on the computing device 120, which can use the mobile application software 122 to present a user with a user interface adapted to receive user feedback or other user response and transmit the user response to one or more servers associated with media outlets 102 that provide television broadcasts 104 or Internet broadcasts 106. In some implementations, a client application 124 can be downloaded to and executed on the computing device 120 and can be used to submit user responses. As another alternative, the client application 124 can be implemented as a thin client application, such that the viewer response user interface functionality can be accessed through a web page interface without installing software locally on the computing device 120. For example, a user can access a web page through browser software on the computing device 120.

In operation, the website 110, mobile application 122 software, and/or client application 124 software can provide a system that enables the user to conveniently submit responses to broadcast requests for viewer responses. This system can employ the user interface 130 of the computing device 120 to present graphical user interface displays appropriate for submitting a requested type of viewer response. The user interface 130 can also be used to potentially present other types of graphical user interface displays transmitted by the view response system 100 and/or the media outlets 102. In general, the information presented on the user interface 130, whether provided through a website 110, mobile application 122, or client application 124, can be coordinated through the viewer response system 100 with programming broadcast through the media outlets 102. For example, as programming is broadcast using one or more of the media outlets 102, triggers can be communicated from the media outlet(s) to the viewer response system 100 to cause the website 110, mobile application 122, and/or client application 124 to present information and/or graphical user interface displays that allow users of computing devices 120 to submit responses to requests for viewer responses that are broadcast from the media outlet(s) 102.

Figure 2:
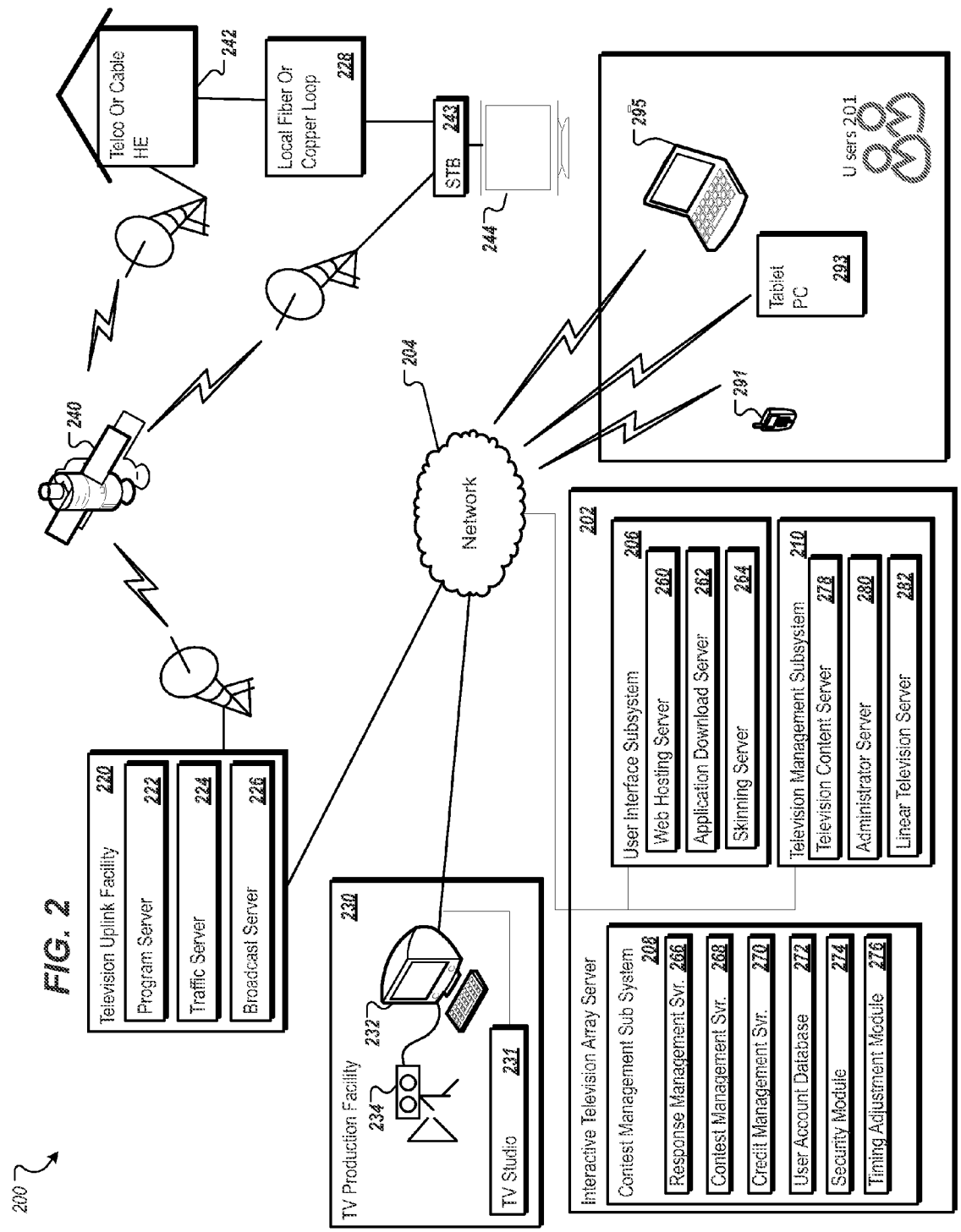
FIG. 2 illustrates a block diagram of basic components of a representative example of a television program system architecture.

FIG. 2 illustrates a block diagram of basic components of a representative interactive television program system 200. The system 200 can include users 201, an interactive television server array 202, a television uplink facility 220, a TV production facility 230, and a number of transmission and receiving ends. These components of system 200 can be connected to one or more communications network(s) 204, such as the Internet, cellular networks, satellite networks, cable networks, optical networks, and/or combinations thereof. The users 201 may access the network 204 using various electronic devices, for example, using a smart phone 291, a tablet PC 293, and/or a laptop computer 295. The interactive television server array 202 can provide, among other things, the functionality of the viewer response system 100 as shown in FIG. 1. The television distribution system 220 generally includes a program server 222 for scheduling programs on the network; a traffic server 224 that keeps track of insertion points for insertion of prerecorded commercials, promotional spots, and other announcements within each scheduled television program; and a broadcast server 226 that generates a linear programming feed for transmission to the carriers 228. The TV production facility 230 is where television programs are produced, and can include a TV studio 231, a production system 232, and recording equipment 234.

The production facility 230 can include a physical or a virtual TV studio 231. For example, the TV studio 231 can be an actual stage setting where contestants are gathered in the setting to compete in a television program. The TV studio 231 can also be a virtual space where contestants participate as a live data stream (e.g., real-time teleconferencing). The television program can be produced using the production system 232 and the recording equipment 234. The production system 232 can render, edit, and process the data captured using the recording equipment 234, which may include a number of cameras placed at various positions and focusing on various contestants. In some embodiments, the recording equipment 234 can be a remote camera, for example, a webcam of a remote user 201; and part of the production data can be gathered from viewers that are physically outside the TV production facility 230 but connected through the network 204. The television program can be produced and finalized at the production system 232 and sent to the television uplink facility 220 for broadcasting.

The television uplink facility 220 can include a network operations center for a television network and/or an uplink facility as described in U.S. patent application Ser. No. 13/013,775. Generally, the program server 222 maintains a database that specifies the program, the episode, the date of transmission, and start and stop times of each. Even when a program is "live," it is accounted for in the programming grid utilizing the programming system. The program server 222 also typically includes additional information on each program, such as its title, describing the program so that it can be published in program guides, etc. For example, a network can use the program server 222, located within a network operations center, for scheduling programs on that network. Networks that sell advertising will also typically operate or make use of a traffic server 224 that is part of a network operations center. The traffic server keeps track of time slots, or so-called "insertion points," within each scheduled TV program, that have been set aside for insertion of prerecorded commercials, promotional spots, and other announcements. The traffic server 224 stores information about each time slot in one or more databases on one or more servers. The broadcast server 226 is used in connection with creating or generating a linear programming feed or television signal that will be transmitted to television carriers, e.g., through a satellite distribution network 240 or other network 204. The broadcast server 226 assembles a program and any insertions into a continuous linear signal according to a schedule stored by the program server 222 and the insertion points specified in the traffic server 224. In some implementations, video or other content from the interactive television server array 202 can be retrieved by the television distribution system 220 using, e.g., a file transfer protocol for inclusion within a specific time slot.

The programming of a television network—the network's signal or feed—is typically distributed to viewers via one or more local broadcast television stations for local broadcast and/or one or more carriers for transmission on other mediums, such as cable TV systems, wired or wireless high-speed broadband networks, mobile data networks, satellite television systems, for substantially simultaneous viewing by multiple users. A TV program to which a network has distribution rights could also be delivered "on demand," meaning at the request of a viewer, in which case program transmission to that user begins at the request of a user and continues according to a predefined timeline. Such on-demand programs generally do not, but could, include predefined time slots within the timeline of the program for advertising, promotional announcements, and other uses. However, transmission of such on-demand programming usually originates from the carrier, such as at the head end of a cable network, or from a server that streams the video over the Internet to the user requesting it.

Typically, a network's signal or feed is transmitted by, or on behalf of the network, distributed simultaneously to one or more TV carriers across some or all of a country or continent using a satellite transmission system. However, other transmission systems, or combinations of systems, can be used. A television network may own and operate its own uplink facility (as the television uplink facility 220), or it may choose to contract with one or more third party uplink facilities to transmit its signal up to a satellite 240 for distribution to one or more television carriers. These television carriers receive the satellite signal and transmit it on their systems to subscribers, who are represented by home 242, but can include any type of residence, as well as bars, restaurants, theatres and other commercial establishments. Each subscriber has, in this example, a set top box 243 or some other gateway or device that receives and decodes the signal from a local fiber optic cable or copper loop 228 so that it can be played on a television or monitor 244. In some instances, the set top box 243 can directly receive signals from the satellite 240, for example, using a receiving satellite dish (e.g., through a direct-broadcast satellite provider).

Representative examples of television carriers include a television service offered over a wired, terrestrial system, e.g., a cable television system or a cable-like television service provided over a telecommunication network system, such as the Verizon FiOS® or AT&T U-VERSE® services, and a satellite television system, such as DirectTV. Other types of distribution systems could be used for transmitting a network's feed to subscribers, including IP television services, which use the Internet protocols and packet-switched networking architectures to carry the signal to subscribers. The television signal or feed generated by the broadcast server 226, is, for example, transmitted to an IP television service provider through a satellite uplink or, alternately, a private network or other connection.

Users 201 may watch a television program and participate in it using different electronic devices. Typically, users 201 watch television programs on the TV 244, and remotely participate in the program using applications or websites on the smart phone 291, the tablet 293, or the computer 295. Alternatively, in some embodiments, users 201 may watch television programs on the computer 295, and remotely participate in the program using applications or websites on the smart phone 291 or the tablet 293, or users 201 may watch television programs on the smartphone 291 and participate using applications or websites on the tablet 293, or the computer 295. In some embodiments, users 201 may use the same electronic device for simultaneously watching and participating in television programs.

The TV production facility 230 can communicate with the television uplink facility 220 and transmit production content through the uplink facility 220 for broadcasting. The production content can include programming that requests or is otherwise adapted for receiving responses from (or participation by) viewers. The interactive television server array 202 can facilitate processing and management of the requests and the responses.

The interactive television server array 202 includes a plurality of servers that support various functionalities and can be implemented on any number of computers. In general, the interactive television server array 202 can support interactions with user devices 291, 293, and 295 to enable viewers of broadcast programming to participate in the programming through their respective user devices. In addition, the interactive television server array 202 can manage responses, allocate credits, handle payments made by users for participation in the programming, and manage contests or awards that involve user responses to requests for viewer feedback on broadcast programming. To support these functions, the interactive television server array 202 can include a user interface subsystem 206, a contest management subsystem 208, and a television management subsystem 210. The user interface subsystem 206 can be used to generate and send user interface components and/or data for displaying user interfaces on user devices 291, 293, 295 that enable users 201 to submit responses and other information to the interactive television server array 202. The contest management subsystem 208 can be used to manage responses and other submissions received from users 201 through the user interfaces, including managing contests among multiple viewers, and to manage deductions and awards of points or other credits. The television management subsystem 210 can be used to coordinate information provided by the user interface subsystem 206 to user devices 291, 293, 295 and the use of responses and other submissions received from users 201 with programs broadcast from or through the TV production facility 230 and/or the television uplink facility 220.

Each of the subsystems in the interactive television server array 202 can include various servers for supporting the functionalities of the subsystem. For example, the user interface subsystem 206 can include a web hosting server 260, an application download server 262, and a skinning server 264. The web hosting server 260 can provide one or more web pages through which users can access services provided by the interactive television server array 202. For example, the web hosting server 260 can host a registration web page that allows users to register with the interactive television server array 202. Registration can involve setting up a user account for use in managing viewer interactions with interactive television programming through the interactive television server array 202. The web hosting server 260 can further host web pages that present various types of controls and/or response submission forms, which can be used by viewers of interactive television programming to submit responses or other feedback. In some implementations, the web hosting server 260 can further host a recorder web page that provides users with access to a thin client application (or web application) that supports video or audio capture for submission of video or audio (e.g., for potential inclusion in a linear television program).

In addition, the application download server 262 can be used to allow users 201 to download client applications for installation on user devices such as the smart phone 291, the tablet PC 293, and the computer 295. Client applications can provide the same or similar functionality to the web pages hosted by the web hosting server 260 but through an application installed on the user device. For example, the client application can include instructions for presenting various user interfaces that support the various functionalities and for communicating with the web hosting server 260 or some other server that provides data specific to a particular interactive television program (e.g., triggers for when to present a particular feedback interface, identification of a type of feedback requested, questions and/or multiple choice answers for the particular program, and other suitable data). Thus, the application download server 262 and the web hosting server 260 can provide viewers with various types of user interfaces for game controls, crowd-sourced voting, and the like. For example, the application download server 262 and/or the web hosting server 260 may allow viewers to use various virtual input devices, such as a joystick, a slider bar, thumb pads, a buzzer, and other controls.

The skinning server 264 can provide web page components that are associated with local broadcast stations. For example, a nationally televised or syndicated program may allow a local television station to include its own branding or other messaging as well as local advertisements, news, events, warnings, etc. as a skin that is applied to the web pages or client application user interfaces associated with a broadcast television program. The skin can include useful or supplemental information and need not interfere with the functionality of the user interface being displayed. In some implementations, multiple different skins can be applied for different users depending on the location of each viewer, which can be determined based, for example, on location information provided by the user device (e.g., using GPS), location information associated with a user profile, an IP address associated with the user device, or by detecting signals (e.g., audio signals) included in a broadcast television program. This location information can also be used to provide rewards to the local television station for its viewers that participate in the interactive programming. For example, the local television station can be awarded credits, points, cash, or other actual or virtual compensation based on participation by its viewers in the interactive programming. The skinning server 264 (or multiple skinning servers), in some cases, can be maintained by the local television station or some third party rather than being associated with the interactive television server array 202. In addition, skins can be also applied by the producer of a television show or by the network on which the show appears. More than one skin can be applied (e.g., by different parties) for a single user interface (e.g., nested skins or skins that are applied to different parts of the user interface). More details about the skinning functionality are described below in FIG. 4.

The contest management subsystem 208 can include a response management server 266, a contest management server 268, a credit management server 270, a user account database 272, a security module 274, and a timing adjustment module 276. The response management server 266 can receive responses from viewers remotely participating in an interactive television program through their respective user devices. For example, viewers can watch television programs that present requests for responses on a conventional TV, a computer (a desktop, laptop, netbook, or tablet), a smart phone, or similar electronic devices. The requests may include selecting from a multiple choice question, answering a true-or-false question, voting for or against an event or role, bidding in an auction, answering an entertaining quiz, or submitting a short video response. The response manager server 266 can sort and save received responses according to the corresponding television program, question type, and request categories, and can generate result reports usable by other server components in the interactive television server array 202. The response management server 266 can also store or otherwise associate the responses with a particular user account defined in the user account database 272. The response management server 266 can interact with the contest management server 268 to provide response data for use in a contest. Furthermore, the response management server 266 can communicate with the credit management server 270 to increment or decrement points or credits or to process a payment (as may be required) for submitting a response.

The contest management server 268 can manage contest procedure, for example, accepting viewer responses that comply with contest rules, in a television program that includes interactive games, in real-time, near real time, or with a delayed feedback. In some instances, the contest management server 268 monitors the number of submissions per viewer (e.g., limiting total number of submissions from the same IP address), the time period in which any submission is allowed, the competition process (e.g., elimination, knockout, etc.), and other aspects of a contest. The contest management server 268 may be tailored to a specific game show program, setting up rules accordingly and operating under the rules. In some instances, the contest management server 268 can determine which contestant has the earliest response to a question or request, recording contestants choices in a game and matching the choices to a database, counting the number of responses as the responses within a given quota can all be rewarded, or surveying viewer opinions for statistical significance. The contest management server 268 may also interact with the user interface subsystem 206 to manage the types of user interfaces or user interface components are presented on user devices. For example, the contest management server 268 can define a sequence of different user interfaces to be presented in connection with a particular contest to allow viewers to submit appropriate responses to requests included in a linear television program. The contest management server 268 can also control the timing of when different user interfaces or user interface components (e.g., game controls) are presented on the user devices. Such timing can be controlled through automated processes (e.g., according to a schedule associated with the corresponding linear television program, or based on triggers communicated to the contest management server 268 from the TV production facility 230, the television uplink facility 220, or the linear television server 282 of the interactive television server array 202). In some cases, e.g., for live television programs, timing may be controlled by a manual process. For example, when a game show host asks a question, an administrator of the interactive television system 202 or show production staff can trigger presentation of a corresponding user interface on user devices through the user interface subsystem 206. The contest management server 268 or another server may also allow administrators or show production staff to create questions or set the value of question responses in real time. The contest management server 268 may also identify winners or winning entries for a particular contest, such that the winning viewer can be awarded points or credits or allowed to or progress to a next round in the program.

The credit management server 270 can include modules for purchasing credits and managing credit allocations and deductions based on viewer interactions. For example, viewers remotely participating in a television game program through a user device can purchase credits using common payment techniques, such as credit card, debit card, or micro payment transactions. The purchased credits can function as a virtual currency that can be spent on services and commodities in the television program. For example, viewers may spend one actual dollar on purchasing 100 credit points, which may then be spent on submitting a contest entry to a television program to be reviewed. The credit management server 270 can monitor transactions and manage the credit accumulation and consumption process. In some instances, a submitted entry may not result in any awards and the credit points are consumed in the process; while in other cases, the submitted entry may result in an award of additional credit points that are added to the user's account. In some implementations, the credits that are used as a virtual currency for purposes of participating in the interactive program can be different than credits that are awarded for responses that satisfy certain predetermined parameters (e.g., correct answers or responses that are selected for inclusion in a linear television program), while in other implementations, both types of credits can be part of the same virtual currency.

The credit management server 270 can also communicate with the user account database 272 to apply earned or purchased credits to a user account or to deduce credits from the user account. The user account database 272 can store registration, profile, payment, preference, and other user related information. The user account database 272 can store data required for viewers to be registered to participate in television programs, including, for example, identification information (e.g., name, date of birth, gender, etc.), contact information (e.g., email, phone number, address, etc.), and other background information (participation history, etc.). The user account database 272 may allow users to import their information from a third party platform, such as a social networking website. The user account database 272 may also allow users to setup a link to a payment method, such as a credit card, with one-time authorization (e.g., authorization at the first time of setup until expired or cancelled). The user account database 272 can serve as a virtual bank account by recording the purchase and usage of credit points. Users may access the credit points by logging into the system; for example, the database 272 enables users to keep a credit balance and spend the balance (e.g., to submit responses to the interactive television server array 202) without re-submitting payment information.

The security module 274 can monitor all transactions and activities of the interactive television server array 202, as the television program may be competitive and involving a large sum of money. The security module 274 can identify and screen any submission that violates certain rules in the system. For example, users may attempt to create virtual credit points without paying, or earn virtual credit points by manipulating account information. The security module 274 can prevent such attempts or can provide other security features that maintain the security of user information or credits. In other instances, users may attempt to violate rules of game play, for example, by increasing allowable number of entries to increase odds, by manipulating submission time stamp to gain advantage, or other unfair play strategies prohibited by the system 200. In these instances, the security module 274 can prevent such operations and temporarily suspend or permanently ban the accounts involved in the operation.

The timing adjustment module 276 can be used to accommodate time differences of viewer responses from different locations. For example, the television program may be a nationwide or worldwide game show that encourages viewers from different places to submit their entries. Due to different connection speeds and variable local broadcasting, viewers may receive requests in the television program at different times. The timing adjustment module 276 can calibrate the time differences and adjust the viewer response time accordingly to ensure a fair play. For example, viewers who can view the request due to higher connection speeds and less local interruption may have a time balance associated with their accounts such that their response time does not have the time advantage. In some implementations, the timing adjustment module 276 can randomly select responses from a batch of responses (e.g., responses received within a particular time window) to avoid basing contest decisions on speed of response. Alternatively, response time can be based on user location or can be measured against some type of signal that is broadcast on the linear television program and detected by the user device through the user's local television 244. For example, because the system 200 is designed for a large number of viewers to participate in television programs, viewer responses and interaction with the television programs may require synchronization. In some instances, the application or website operating on the user devices may include an internal timer that can be triggered during game play. The internal timer, through network or satellite connection, can be synchronized with a master clock on the broadcasting linear television program. In some instances, an audible queue may be imbedded in the linear television program to onset certain game elements on the user devices. For example, to set a starting moment to activate game controls on the user devices (e.g., allowing the game controls to connect with the television program, such as enabling a joystick). Here again, the security module 274 can be used to prevent attempts to circumvent functions of the timing adjustment module 276.

The television management subsystem 210 can include a television content server 278, an administrator server 280, and a linear television server 282. The television content server 278 can be used to store content for potential inclusion in linear or broadcast television programming. For example, users may submit user-generated videos or other content requested during a television program, which can be stored by the television content server 278. User content can be submitted by various mobile electronic devices or other computing devices, such as described above in connection with FIG. 1. Video content stored on the television content server 278, or by another database, can be reviewed using an administrator server 280. The video content can also be organized for review using the administrator server 280 according to the intended type of distribution (e.g., web or television) and program (e.g., such that an administrator can review only videos submitted for inclusion in a particular program). The administrator server 280 can also be used to select videos or other content for inclusion in linear programming and to assign a particular segment in which a video is included in linear programming as described in U.S. patent application Ser. No. 13/185,477. For example, in some implementations, the administrator server 280 can communicate with the television distribution system 220 to assign a video to an available time slot or segment in a linear programming sequence and/or to associate a previously assigned content name included in the linear programming sequence (e.g., a content name used as a placeholder for subsequently generated video) to a video submitted through the interactive television server array 202. Alternatively, segments for inclusion in a linear programming schedule can be defined at the linear television server 282, which can transmit linear television programming to the television uplink facility 220. The linear television server 282 can queue programs produced in the TV production facility 230 and/or content (e.g., videos and/or responses to requests for viewer feedback) submitted by the users 201.

Functionalities of the interactive television server array 202 can be segmented in other ways across multiple servers or can be combined in different ways than described above (e.g., some of the functions described as being performed by different servers could be combined in a single server), and the interactive television server array 202 also include other functionalities. The servers in the interactive television server array 202 can communicate with one another through one or more networks (e.g., a local area network and/or a wide area network). In some implementations, the system 200 can be implemented within an environment such as depicted in and described with reference to FIG. 1 of U.S. patent application Ser. No. 13/013,775. The system 200 can be used, for example, to perform the process depicted in and described with reference to FIGS. 2A and 2B of U.S. patent application Ser. No. 13/013,775.

Figure 3:
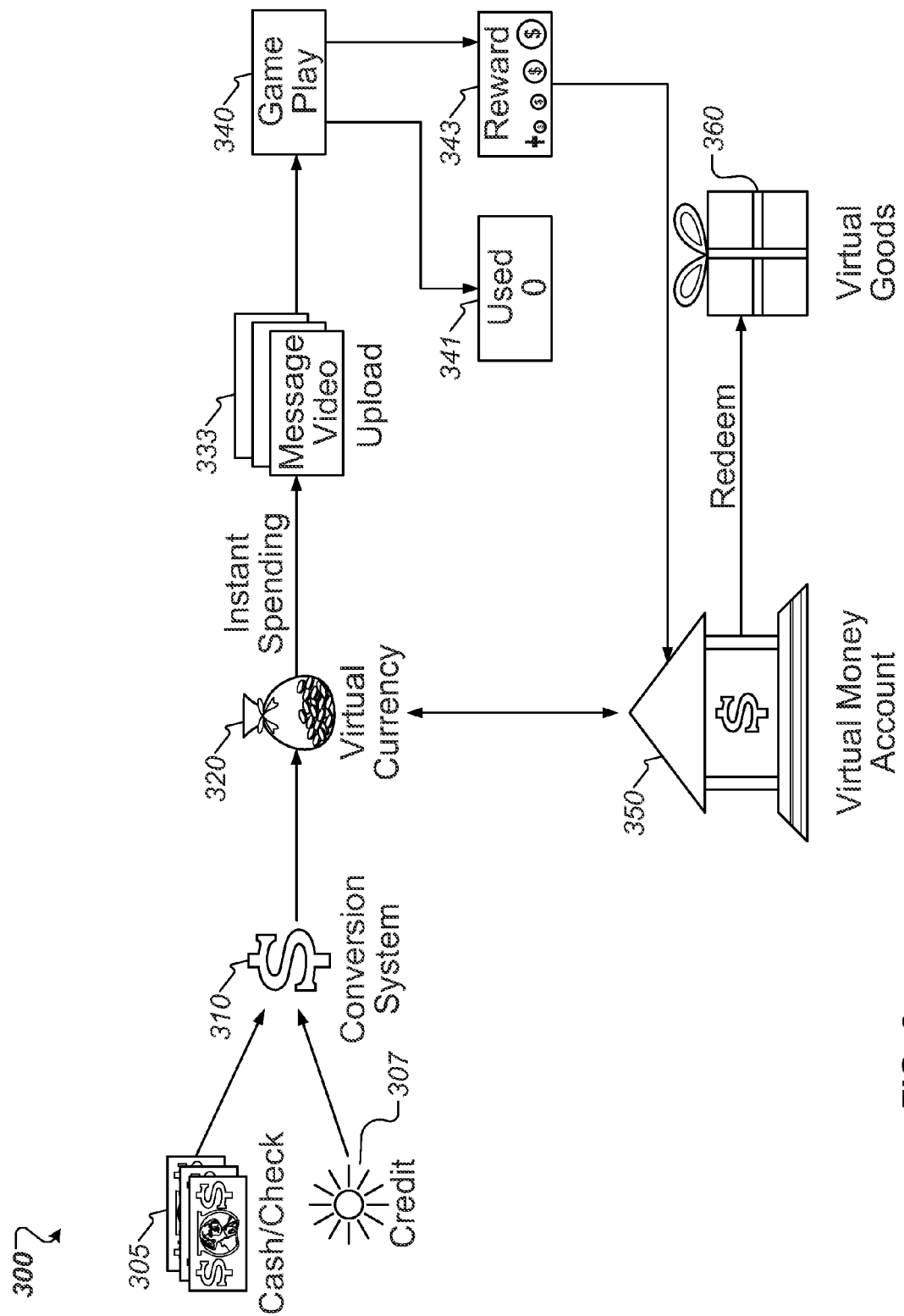
FIG. 3 is an example of a virtual currency flow for an interactive television system.

FIG. 3 is an example of a virtual currency flow 300. The virtual currency flow 300 can represent the participation process of users 201 in interactive television programs supported by the system 200 shown in FIG. 2. Viewers who are watching a television program and decide to participate in the program (e.g., in response to a request or invitation to submit responses, vote, provide feedback, or participate in gameplay) become users 201 in the system 200. Upon registration, users can use cash or check 305, or a credit account 307 (e.g., PayPal™, ACH transfer, credit cards, debit card, etc.) to purchase virtual currency at a conversion system 310. The conversion system 310 can define a conversion rate for converting real currency into virtual currency, and, in some implementations, vice versa. The conversion rate may be related to a user's status, a temporary promotion, or other factors. A realized virtual currency 320 can then be assigned to the corresponding user account 350. The virtual currency 320 (or a portion thereof) may be spent instantly on content submission 333 for participating in a television program gameplay 340. The content submission 333 can include text or voice messages, a vote, a feedback submission, a short video clip, and/or other suitable content. In some implementations, the gameplay 340 may yield two possible results for the users: winning, which results in being awarded additional virtual currency 343; or not winning, in which case the spent value 341 is consumed. The result of the activity (e.g., award of virtual currency or deduction of virtual currency) is saved in the user account 350. In some cases, virtual currency is deducted for the content submission 333, which corresponds to the spent value 341, and additional virtual currency 343 is only awarded if the content submission 333 results in winning or some other satisfaction of predefined criteria. The additional virtual currency 343 can be greater than or less than the spent value 341. The users can use the virtual currency saved in the user account 350 to redeem virtual goods or services 360.

The gameplay 340 may include various scenarios for users to earn virtual currency rewards 343. For example, users can receive rewards 343 for sending correct answers to the gameplay 340. On the other hand, users can lose the spent value 341 for sending incorrect answers. If the gameplay 340 involves voting, for example, choosing the most popular performer in the television program, users may need to spend the spent value 341 for the voting right. In some implementations, the gameplay 340 can be an auction in which users bid on goods or services using the virtual currency 320 or actual currencies 305 or 307. The gameplay 340 may include surveys or other submissions of opinion or fact content. The gameplay 340 may also involve submission of user-generated media content, such as video, audio, text, multimedia content, or any other suitable content. If the content submission 333 is, for example, a video response that is selected through the gameplay 340 for inclusion in a television program or web page, the corresponding user of the selected submission 333 can also be awarded with additional virtual currency rewards 343.

The gameplay 340 is not limited to actual games but can include any viewer response format, such as one or more of the formats described below. The gameplay 340 can relate to a trivia response/quiz game in which users submit answers to trivia questions. Such a game format allows an undefined number of participants to compete in terms of speed and accuracy. Winners can be awarded with actual or virtual credit rewards 343. An entry fee in a specified amount of the virtual currency 320 may be required to participate or to submit each response. In some embodiments, the gameplay 340 may relate to a dating game in seeking relationships. Users may vote on questions to be asked or the winning chances of players in the television program. In some embodiments, the gameplay 340 may relate to a game of chance. In some embodiments, the game play 340 can relate to a game of prediction. For example, users may submit a video clip following certain topics or scenarios. A portion of the video clip will be played in the television program; and other viewers can vote on what happens next in the video clip (e.g., by completing a multiple choice question). Other embodiments of the gameplay 340 are possible.

Figure 4:
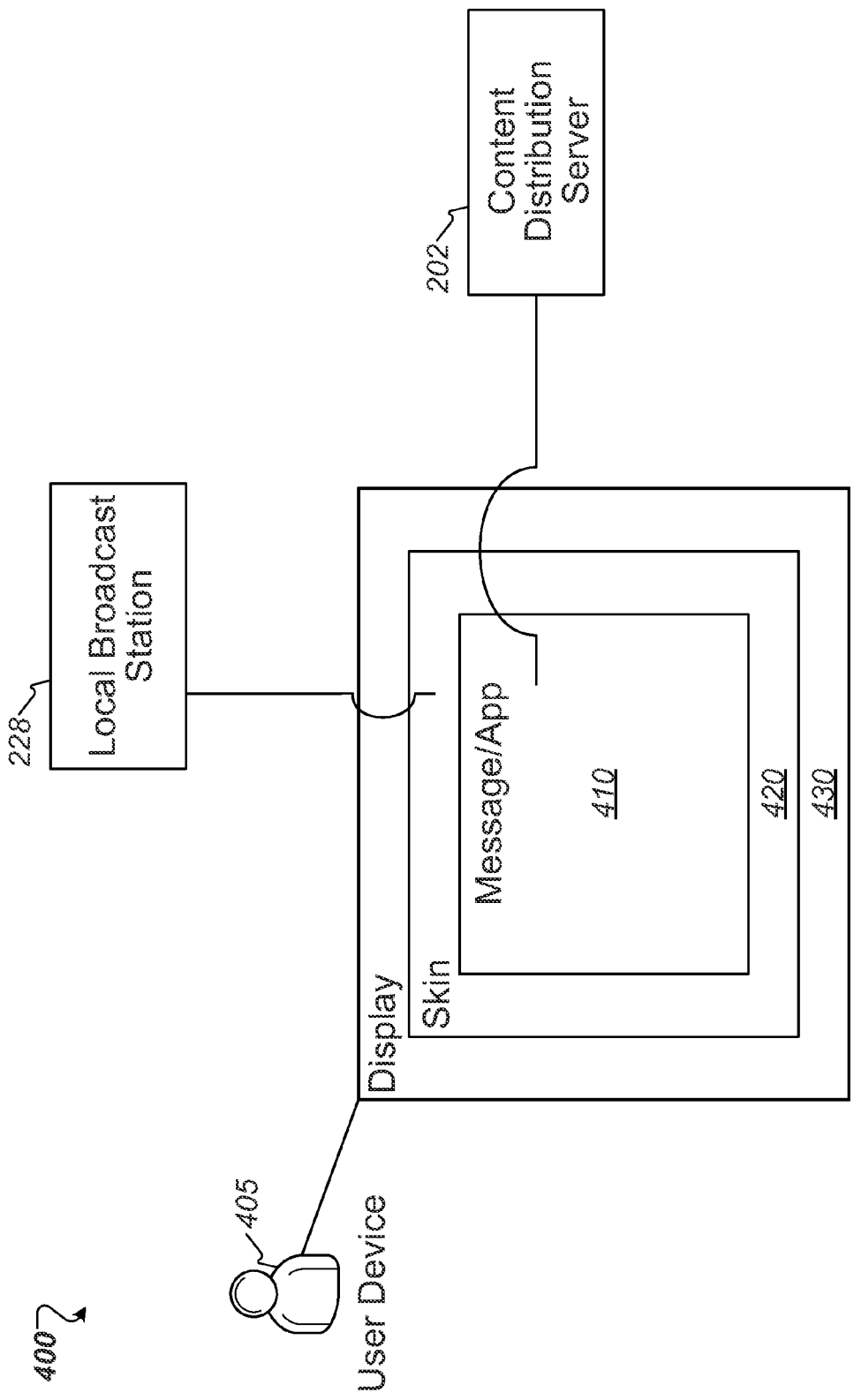
FIG. 4 is an illustration of a graphical user interface for a user device operating in an interactive television system.

FIG. 4 is an illustration of a graphical user interface (GUI) 400 for providing responses from a user device to an interactive television program. The GUI 400 may be displayed on a display 430 of a user electronic device 405. The user device 405 can be the smartphone 291, the tablet PC 293, and the computer 295 as shown in FIG. 2. As an example, the display 430 can be a multi-touch back-lit screen that functions both as an input and an output device. The display 430 in operation can include components that are defined by a skin 420 and a message or application 410. The message or application 410 can include one or more components provided by the interactive television server array 202 that define content associated with a television program. The skin 420 can include one or more components selected by a local television station or by a third party, as defined by, for example, the skinning server 264 within the interactive television server array 202.

Figure 5A:
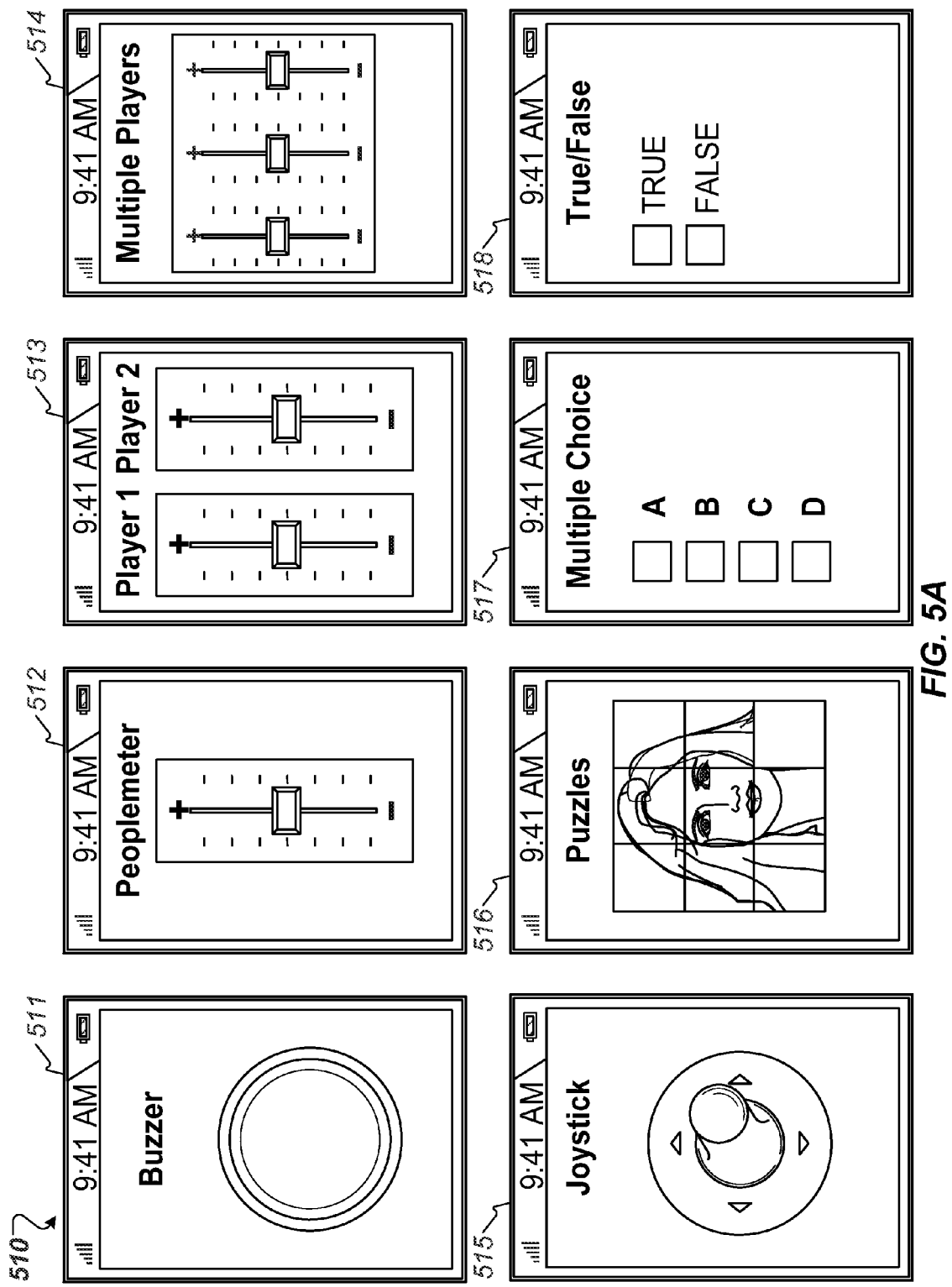
FIGS. 5A and 5B are illustrations of various examples of user control applicable to the graphical user interface of FIG. 4.
Figure 5B:
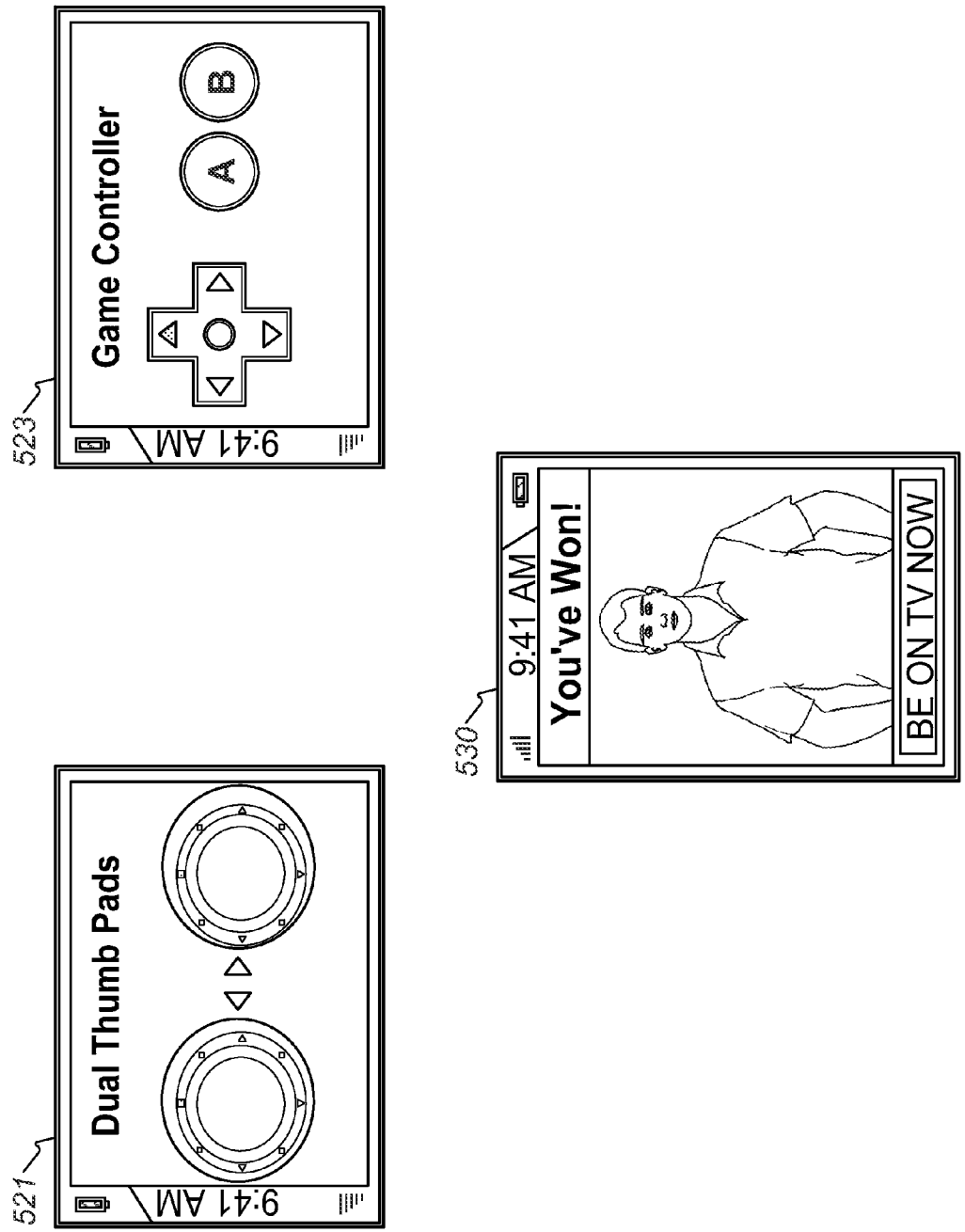

FIGS. 5A and 5B are illustrations of various examples of user control applicable to the graphical user interface of FIG. 4. FIG. 5A includes different one-way communication game controls 510. For example, a buzzer 511 allows users to respond to a certain timed event. A "viewermeter" 512 can allow users to indicate their evaluation of a certain event or player in the television program. A pair of "viewermeter" 513 can be used to compare and evaluate two players or groups of players in the television program. Such control mechanism may be extended to multiple players or groups, such as the 3-player "viewermeter" 514.

FIG. 5A also includes different game controls with limited feedback information. For example, a joystick 515 may allow users to select options or control game characters in a television program. A simple puzzle 516 may be presented in the television program for awarding those who are quickest to solve the puzzle 516 with credit rewards or further participation opportunities. A multiple choice controller 517 and a true-or-false controller 518 can allow users to answer or vote on certain requests in a television program; and winners may be judged based on a correct response. Responses can be received in real-time, near real-time, or delay. In some implementations, two or more users can be selected to participate in a head-to-head competition in which the users control characters displayed in a television program in real-time. In other implementations, any number of users may participate in a trivia contest to try to provide correct answers in real-time or near real-time (e.g., to try to correctly answer questions faster than an in-studio contestant or within a specified time period). In other implementations, users can submit responses that include user-generated content (e.g., videos), which can be judged as most entertaining or interesting, with the winning entries being included in a later segment of the same program or in a subsequent television program.

FIG. 5B illustrates additional example two-way game controls. For example, dual or bi-directional thumb pads 521 can let users to play video games along with other contestants in the television program. Similarly, a multi-directional or multiple button controller 523 can be used. In some implementations, if a user outperforms other competitors, an invitation screen 530 may be prompted to let the user be instantly on TV, such as using an electronic device with a connected or built-in camera. The game controls illustrated in FIGS. 5A and 5B can be displayed in the application area 410 of GUI 400, shown in FIG. 4. Other game controls can be used.

Figure 6:
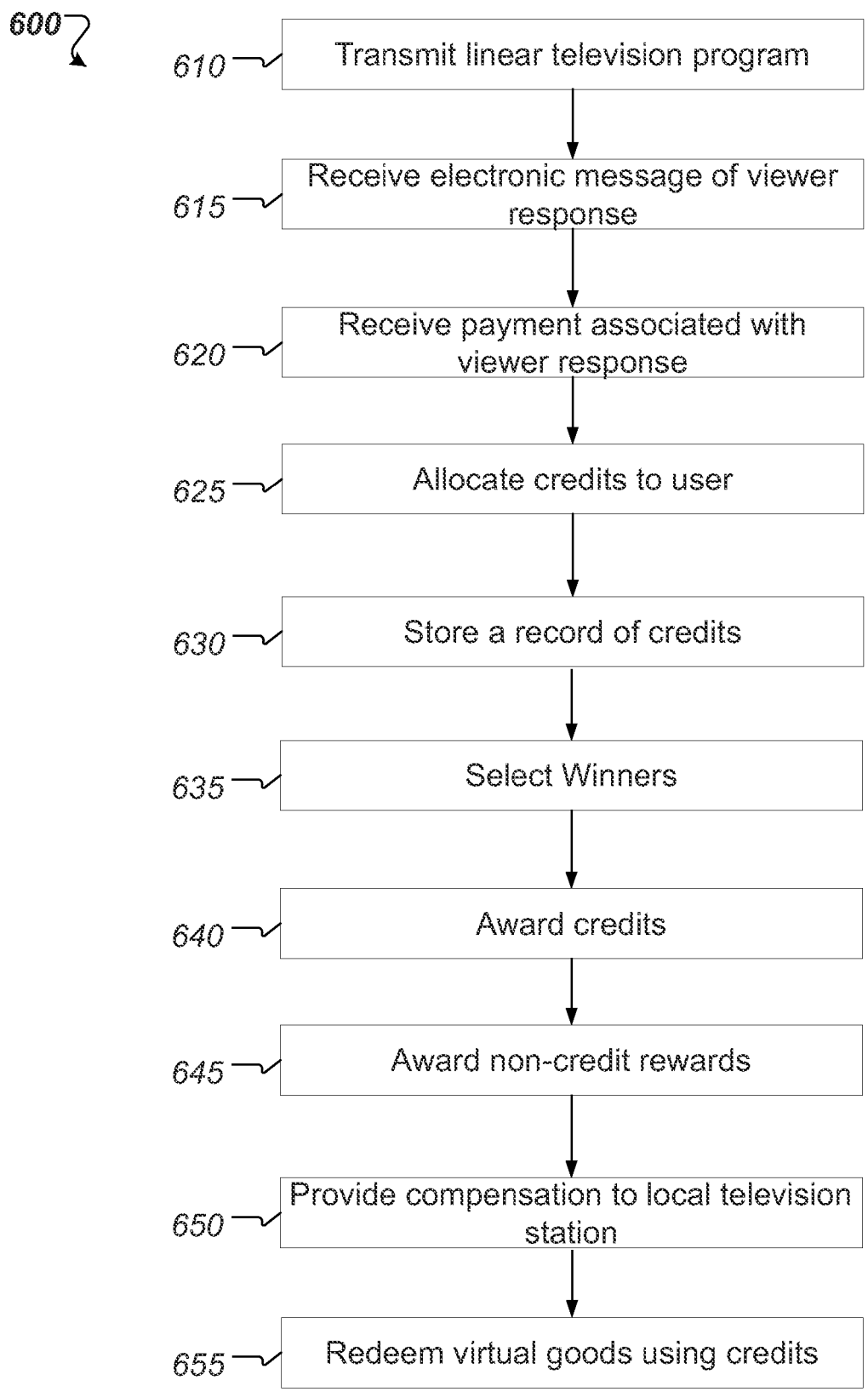
FIG. 6 is a flow diagram of participating in television programs.

FIG. 6 is a flow diagram 600 of a process for viewer participation in television programs. The flow diagram 600 can be used with the participation process illustrated in FIG. 3 and/or the system 200 shown in FIG. 2. At 610, a linear television program is transmitted for broadcast. The linear television program can include a game show, a quiz show, a reality show, or other television programs. On some shows contestants compete against other players or another team while other shows involve contestants playing alone for a particular outcome or a high score. The linear television program can include a request for viewer responses. For example, the linear television program can request viewers provide answers to factual or opinion questions, feedback on television contestants, control of an object displayed on television, and other similar requests. Viewers can submit the responses using a user device, such as a cellular phone, a smart phone, a wireless user device, a computer, etc.

At 615, an electronic message including a viewer response is received through a communication network. The electronic message can include a viewer response to the request from a user. The communication network can be a wireless network, a cellular network, the internet, and/or other communication networks. The electronic message can include text, audio, video, or other electronic format response that can be input on the user device and sent to servers associated with the television program. In some implementations, a number of electronic messages from a number of users can be received. Each electronic message of these users can include a viewer response to the request.

At 620, a payment is received (e.g., a payment made by the user in exchange for the opportunity to participate). The payment can be associated with the viewer response at 615 or can be received in advance of the viewer response. They payment can be submitted as cash or check at a store, or with a digital account, such as using PayPal™, a credit card, ACH transfer, or a debit card. In some implementations, a payment from each of a number of users can be received associated with the viewer response from each user. In addition, in some implementations, instead of a monetary payment, other consideration can be provided, such as performing a specified activity (e.g., viewing an advertisement or recommending participation to other potential viewers). In some implementations and/or in some situations, payment may not be required to participate. At 625, a quantity of credits is allocated to each user in response to receiving the viewer response and the payment associated with the response. The number of credits can be determined based, for example, on whether the viewer response satisfies predefined criteria or is selected for inclusion in a linear television program. The number of credits can also be determined, at least in part, by a conversion rate related to user account information. At 630, the amount of credits allocated to each user is stored as a record of credits in the user account, in association with a user identifier. The credits stored or allocated to each user can be used to submit additional viewer responses, to participate in other activities in the same or a different linear television program, or to purchase other virtual goods and services.

At 635, based on the electronic messages submitted by the users, one or more winners may be selected. For example, if the request in the linear television program is a quiz question, a quota may be used to select the first batch of users that submitted the correct answer, or if the request is a series of quiz questions, the highest scoring set of users may be selected as winners. Additional credits and/or cash or other awards with a cash value can be allocated to each winner can be based on one or more criteria related to the viewer response, for example, based on correctness, speed of response, uniqueness of response, etc. The selected winners may receive credit awards at 640 or non-credit rewards at 645. For example, credit awards can include adding virtual credits to the user account, which may be used for future participation in interactive television programming or redemption for virtual goods or services. Non-credit rewards can include direct opportunities to submit videos for TV broadcasting, a given number of times for future electronic message submission, a pre-announced virtual goods or service, or other types of similar rewards.

At 650, compensation may be provided to local television stations through which viewers who submitted responses viewed the television programming.

At 655, credits associated with user identifiers can be redeemed in exchange for virtual goods or services associated with delivery of content over a network. For example, a virtual service can include an opportunity for viewers to participate in a linear television program, such as in-person attendance or through a camera device (e.g., live or by submitting a recorded video). In some instances, the virtual goods or services can include an opportunity to submit at least one of a video or a textual message to be included in linear television programming, or in content delivered from a web server. The virtual goods and services can also include a premium service, e.g., access to restricted content of the opportunity to receive content without advertising.

Figure 7:
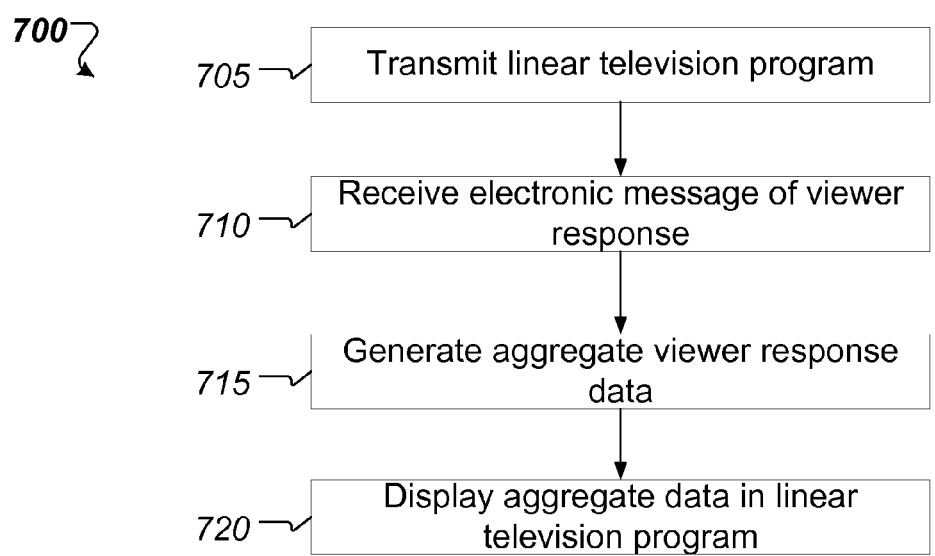
FIG. 7 is a flow diagram of a process for providing feedback in an interactive television system.

FIG. 7 is a flow diagram of a process 700 for providing feedback in an interactive television system. A linear television program is transmitted at 705. The linear television program can include a request for viewer responses to be submitted using a user device. For example, the requested viewer responses can be for positive and negative feedback or ranking feedback relating to contestants or activities included in the linear television program. Various different users (e.g., a significant portion of the viewing audience) can submit electronic messages that include a viewer response to the request, which responses can be received at 710. Each viewer response can be submitted using a user device corresponding to the particular viewing individual, and the electronic messages can be transmitted through one or more communication networks (e.g., cellular networks, LANs, WANs, the Internet, etc.) to a server associated with the interactive television system. For example, the responses can be received at the response management server 266 of FIG. 2. The viewer responses can be submitted, for example, using a "viewermeter" 512, 513, or 514 shown in FIG. 5A, in which different positive and negative feedback levels can correspond or can be mapped to different values. Other types of viewer responses (e.g., rankings of different contestants) can also be used. Viewers can be encouraged to submit responses by offering awards (e.g., monetary prizes, other prizes with monetary value, or virtual currency credits) that can be awarded to viewers randomly or based on some predetermined criteria. Viewers can also be awarded credits based on complying with certain criteria.

Data from the electronic messages is combined to generate aggregate data at 715. For example, the values received from the various different users can be averaged or combined in some other manner to generate the aggregate data. As one example, if feedback is received on a scale of 1 to 10, with 1 representing strongly negative feedback and 10 representing strongly positive feedback, values from the individual viewer responses can be averaged to generate an aggregate positive or negative rating (e.g., for one or more contestants in a reality show). The aggregate data can be calculated based on all received responses or can be calculated based on a rolling window (e.g., based on the last ten seconds or sixty seconds of feedback). The latter technique can be used to more accurately track trends and avoid tendencies for the aggregate data to approach a median value. Alternatively, data can be weighted according to age, such that the influence of viewer feedback is gradually phased out as the viewer feedback ages. The generation of aggregate data can be performed, for example, by the contest management server 270 shown in FIG. 2.

The aggregate data can be displayed in near real time as part of the linear television program at 720. For example, an inset graph can be displayed as part of the broadcast program to show the trend of average feedback for contestants or activities on the program. The display of aggregate data can be managed by the television content server 278 or the linear television server shown in FIG. 2, which can send the aggregate data to the television uplink facility 220 or the TV production facility 230 to be merged with the video being broadcast.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A method comprising:
    transmitting a linear television program, wherein the linear television program includes a request for viewer responses to be submitted using a user device;
    receiving, through a communication network, an electronic message including a viewer response to the request from a user;
    receiving a payment, wherein the viewer response is associated with the payment and the viewer response provides information from which a source of the payment can be determined, and wherein the payment includes, at least in part, credits stored in association with an identifier of the user;
    allocating one or more credits to the user in response to receiving the viewer response and receiving the payment associated with the viewer response;
    storing a record of the one or more credits in association with an identifier of the user; and
    redeeming credits associated with the identifier of the user in exchange for goods or services.

2. The method of claim 1 further comprising:
    receiving, through a communication network, a plurality of electronic messages from a plurality of users, with each electronic message including a viewer response to the request from a respective user;
    receiving a payment associated with the viewer response from each respective user;
    allocating one or more credits to each user in response to receiving the viewer response from the respective user and receiving the payment associated with the viewer response; and
    storing a record of the one or more credits in association with an identifier of the respective user.

3. The method of claim 2 further comprising redeeming credits associated with the identifier of each respective user in exchange for goods or services.

4. The method of claim 2 further comprising selecting one or more of the plurality of users to receive an award having monetary value, with each user selected based on the viewer response of the respective user.

5. The method of claim 4 wherein the request for viewer responses includes an offer for the award having monetary value in exchange for a viewer response that at least satisfies predetermined criteria.

6. The method of claim 4 wherein the request for viewer responses includes an offer for the award having monetary value in exchange for a viewer response that is selected for distribution.

7. The method of claim 2 further comprising selecting one or more of the plurality of users to receive an award associated with delivery of content over a network, with each user selected based on the viewer response of the respective user.

8. The method of claim 2 wherein the number of credits allocated to each user is based upon one or more criteria related to the viewer response of the respective user.

9. The method of claim 2 further comprising selecting one or more of the plurality of users to compete for an award based on the viewer responses from the one or more selected users to requests included in the linear television programming.

10. The method of claim 9 wherein the award includes an opportunity to participate in a linear television program.

11. The method of claim 2 further comprising:
    combining data from the plurality of electronic messages to generate aggregate data; and
    including a display of the aggregate data in the linear television program.

12. The method of claim 11 wherein the request for viewer responses includes a request for feedback relating to the linear television program.

13. The method of claim 11 wherein the plurality of electronic messages are received through a plurality of user devices remotely located from a studio source of the linear television program.

14. The method of claim 11 wherein the electronic message is submitted by each of the plurality of viewers through an application on a corresponding user device, with the application associated with the linear television program.

15. The method of claim 11 wherein the electronic message is submitted by each of the plurality of viewers through a web page displayed on a corresponding user device, with the web page associated with the linear television program.

16. The method of claim 2 wherein the payment is associated with the viewer response based on user login credentials associated with a user account.

17. The method of claim 2 wherein the payment is made using credits in a virtual currency.

18. The method of claim 2 wherein the payment is made using credits awarded in exchange for monetary value.

19. The method of claim 2 wherein the payment is made by a sponsor.

20. The method of claim 2 wherein the payment is made using credits awarded in exchange for viewing advertising.

21. The method of claim 2 wherein the payment is associated with one of a credit card, debit card, a bank account, online payment account, or micro payment transaction.

22. The method of claim 2 wherein the payment is associated with a pre-authorized subscription.

23. The method of claim 2 wherein the payment comprises a fee for each viewer response.

24. The method of claim 2 wherein the payment is made using credits awarded in exchange for a referral.

25. The method of claim 1 wherein the payment includes, at least in part, credits purchased for monetary value, wherein the credits are associated with the user.

26. The method of claim 1 wherein the payment includes, at least in part, credits earned through performing predefined actions.

27. The method of claim 1 wherein the goods or services include a premium user experience associated with content delivered from a web server.

28. The method of claim 1 wherein the electronic message is submitted by the user through an application on a user device, with the application associated with the linear television program and the application is skinned by a distributor of the linear television program or a producer of the linear television program.

29. The method of claim 1 wherein the electronic message is submitted by the user through a web page displayed on a user device, with the web page associated with the linear television program.

30. The method of claim 1 further comprising providing compensation to a local television station that broadcasts the linear television program to the user.

31. The method of claim 1 wherein the viewer response identifies a user account and the user account identifies the source of the payment.

32. The method of claim 1 wherein the viewer response identifies the source of the payment.

33. A computer storage medium encoded with a computer program, the program comprising instructions that when executed by data processing apparatus cause the data processing apparatus to perform operations comprising:
receiving, through a communication network, a plurality of electronic messages each including a viewer response from a respective user device, wherein the electronic messages are received in response to a request included in a linear television program;
deducting payments from one or more accounts, wherein each payment is associated with the viewer response from the respective user device and the viewer response provides information from which a source of the payment can be determined, and wherein the payment includes, at least in part, credits stored in association with an identifier of the user;
allocating one or more credits to one or more of the users in response to at least receiving the viewer response from the respective user device;
storing a record of the one or more credits in association with an identifier of the one or more users, wherein the credits are redeemable in exchange for goods or services.

34. The computer storage medium of claim 33 wherein the one or more credits are allocated to the one or more users based on criteria associated with the viewer responses.

35. The computer storage medium of claim 33 wherein the payments are based on credits purchased for monetary value.

36. The computer storage medium of claim 33 wherein the goods or services include an opportunity to submit at least one of a video or a textual message to be included in at least one or linear television programming or content delivered from a web server.

37. The computer storage medium of claim 33 wherein the payment is associated with the viewer response based on user login credentials associated with a user account.

38. The computer storage medium of claim 33, wherein the program comprises instructions that when executed by data processing apparatus cause the data processing apparatus to perform operations including:
receiving at least one electronic message from an additional user including a viewer response to the request without receiving a payment associated with the viewer response from the additional user; and
allocating one or more credits to the additional user in response to receiving the viewer response from the additional user, wherein a quantity of credits allocated to the additional user differs from a quantity of credits allocated to users submitting viewer responses with an associated payment.

39. The computer storage medium of claim 33 wherein a quantity of credits allocated to each user is based, at least in part, on user status information associated with a user account for the respective user.

40. A system comprising:
a user device; and
one or more servers operable to interact with the user device and to:
transmit data for use in presenting a user interface on the user device, wherein the user interface is adapted to receive user input for submitting a response to a request for viewer responses included in a linear television program;
receive an electronic message, wherein the electronic message includes a response to the request, with the response received through the user device;
deduct a payment from an account based on the response received through the user device and the response provides information from which a source of the payment can be determined, and wherein the payment includes, at least in part, credits stored in association with an identifier of the user;
allocate one or more credits to the user in response to receiving the electronic message; and
store a record of the one or more credits in association with a user account.

41. The system of claim 40 wherein the one or more servers are further operable to:
receive a request to redeem the credits associated with the user account for goods or services.

42. The system of claim 40 wherein the payment is deducted from a sponsor account.

43. The system of claim 40 wherein the payment is associated with a pre-authorized subscription.

44. The system of claim 40 wherein the one or more servers are operable to:
receive at least one electronic message from an additional user including a viewer response to the request without receiving a payment associated with the viewer response from the additional user; and
allocating one or more credits to the additional user in response to receiving the viewer response from the additional user.

45. A method comprising:
- transmitting a linear television program, wherein the linear television program includes a request for viewer responses to be submitted using a user device;
- receiving, through a communication network, a plurality of electronic messages from a plurality of users, with each electronic message including a viewer response to the request from a respective user;
- receiving a payment associated with the viewer response received from each respective user;
- allocating one or more credits to each user in response to receiving the viewer response from the respective user and receiving the payment associated with the viewer response;
- storing a record of the one or more credits in association with an identifier of the respective user;
- receiving at least one electronic message from an additional user including a viewer response to the request without receiving a payment associated with the viewer response from the additional user; and
- allocating one or more credits to the additional user in response to receiving the viewer response from the additional user, wherein a quantity of credits allocated to the additional user differs from a quantity of credits allocated to users submitting viewer responses with an associated payment, wherein the credits are redeemable in exchange for goods or services.

46. A method comprising:
- transmitting a linear television program, wherein the linear television program includes a request for viewer responses to be submitted using a user device;
- receiving, through a communication network, a plurality of electronic messages from a plurality of users, with each electronic message including a viewer response to the request from a respective user;
- receiving a payment associated with the viewer response received from each respective user;
- allocating one or more credits to each user in response to receiving the viewer response from the respective user and receiving the payment associated with the viewer response;
- receiving at least one electronic message from an additional user including a viewer response to the request without receiving a payment associated with the viewer response from the additional user;
- allocating one or more credits to the additional user in response to receiving the viewer response from the additional user, wherein a quantity of credits allocated to the additional user differs from a quantity of credits allocated to the respective users submitting viewer responses with an associated payment; and
- storing a record of the one or more credits in association with an identifier of the respective user and in association with an identifier of the additional user.

47. The method of claim 46 wherein a quantity of credits is based on a status of the respective user.

48. A method comprising:
- transmitting a linear television program, wherein the linear television program includes a request for viewer responses to be submitted using a user device;
- receiving, through a communication network, an electronic message including a viewer response to the request from a user;
- receiving a payment, wherein the viewer response is associated with the payment;
- allocating one or more credits to the user in response to receiving the viewer response and receiving the payment associated with the viewer response;
- storing a record of the one or more credits in association with an identifier of the user; and
- redeeming credits associated with the identifier of the user in exchange for goods or services, wherein the goods or services include an opportunity to submit at least one of a video, an audio message, or a textual message to be included in linear television programming.

49. The method of claim 48 wherein the goods or services include an opportunity to submit at least one of a video, an audio message, or a textual message to be included in linear television programming.

50. The method of claim 49 wherein the number of credits allocated to each user is based upon one or more criteria related to the viewer response of the respective user.

51. The method of claim 48 wherein the goods or services include an opportunity to submit at least one of a video, an audio message, or a textual message to be included in content delivered from a web server.

* * * * *